(12) United States Patent
Richiuso

(10) Patent No.: US 6,650,837 B1
(45) Date of Patent: Nov. 18, 2003

(54) DUAL IMAGE VIEWFINDER FOR CAMERA

(75) Inventor: Leonard Richiuso, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/175,690

(22) Filed: Jun. 20, 2002

(51) Int. Cl.[7] .......................... G03B 13/02; G03B 13/08
(52) U.S. Cl. ........................ 396/373; 396/374; 396/385
(58) Field of Search ........................... 396/141, 148, 396/296, 373–378, 381, 382, 385, 386

(56) References Cited

U.S. PATENT DOCUMENTS

| | | | |
|---|---|---|---|
| 2,244,505 A | 6/1941 | Sauer | 396/373 |
| 4,011,571 A | 3/1977 | Okuzawa | 396/291 |
| 4,536,074 A | 8/1985 | Someya et al. | 396/243 |
| 5,266,985 A | 11/1993 | Takagi | 396/147 |
| 5,581,319 A | * 12/1996 | Ohashi | 396/374 |

* cited by examiner

*Primary Examiner*—Della J. Rutledge
(74) *Attorney, Agent, or Firm*—Roger A. Fields

(57) ABSTRACT

In a viewfinder for a camera, a first front finder lens forms an image of a subject including a background area of the subject, a second front finder lens forms an image of the subject including a background area of the subject that is greater than the background area of the subject included in the image of the subject formed by the first front finder lens, and a rear finder lens permits simultaneous viewing of the images of the subject formed by the first and second finder lenses, whereby dual images of the subject including greater and lesser background areas of the subject can be simultaneously viewed when looking through the rear finder lens. When one sees in the viewfinder the difference between the greater and lesser background areas of the subject, he or she is alerted to take care in composing the picture to be taken.

17 Claims, 2 Drawing Sheets

DUAL IMAGE VIEWFINDER FOR CAMERA

FIELD OF THE INVENTION

The invention relates generally to viewfinders for cameras, and in particular to a viewfinder that facilitates good composition of a picture to be taken.

BACKGROUND OF THE INVENTION

When taking a picture it is necessary to know not only in what direction to aim the camera but also how much of the subject will be included in the picture. For this reason practically every camera has a viewfinder of some kind.

When one views the image of a subject in the viewfinder of a camera, the background area of the subject that can be seen in the viewfinder is typically 5%–15% less than the background area in the picture that is taken. Thus, the viewfinder can fall short of facilitating good composition of the picture.

SUMMARY OF THE INVENTION

According to one aspect of the invention a dual image viewfinder comprises:

a first front finder lens for forming an image of a subject including a background area of the subject;

a second front finder lens for forming an image of the subject including a background area of the subject that is greater than the background area of the subject included in the image of the subject formed by the first front finder lens; and a rear finder lens for simultaneously viewing the images of the subject formed by the first and second finder lenses, whereby dual images of the subject including greater and lesser background areas of the subject can be simultaneously viewed when looking through the rear finder lens.

When one sees in the viewfinder the difference between the greater and lesser background areas of the subject, he or she is alerted to take care in composing the picture to be taken.

According to another aspect of the invention a method of viewing dual images of a subject in a viewfinder, comprises the steps:

forming a first image of the subject including a background area of the subject;

forming a second image of the subject including a background area of the subject that is greater than the background area of the subject included in the first image; and permitting simultaneous viewing of the first and second images of the subject including the greater and lesser background areas of the subject.

Also, there is optionally included in the method the steps:

superimposing an image of a first frame on the second image of the subject;

superimposing an image of a second frame on the first image of the subject, whereby, the image of the second frame superimposed on the first image of the subject and the image of the first frame superimposed on the second image of the subject can be simultaneously viewed.

DETAILED DESCRIPTION OF THE INVENTION Viewfinder

Figures 2, 3:
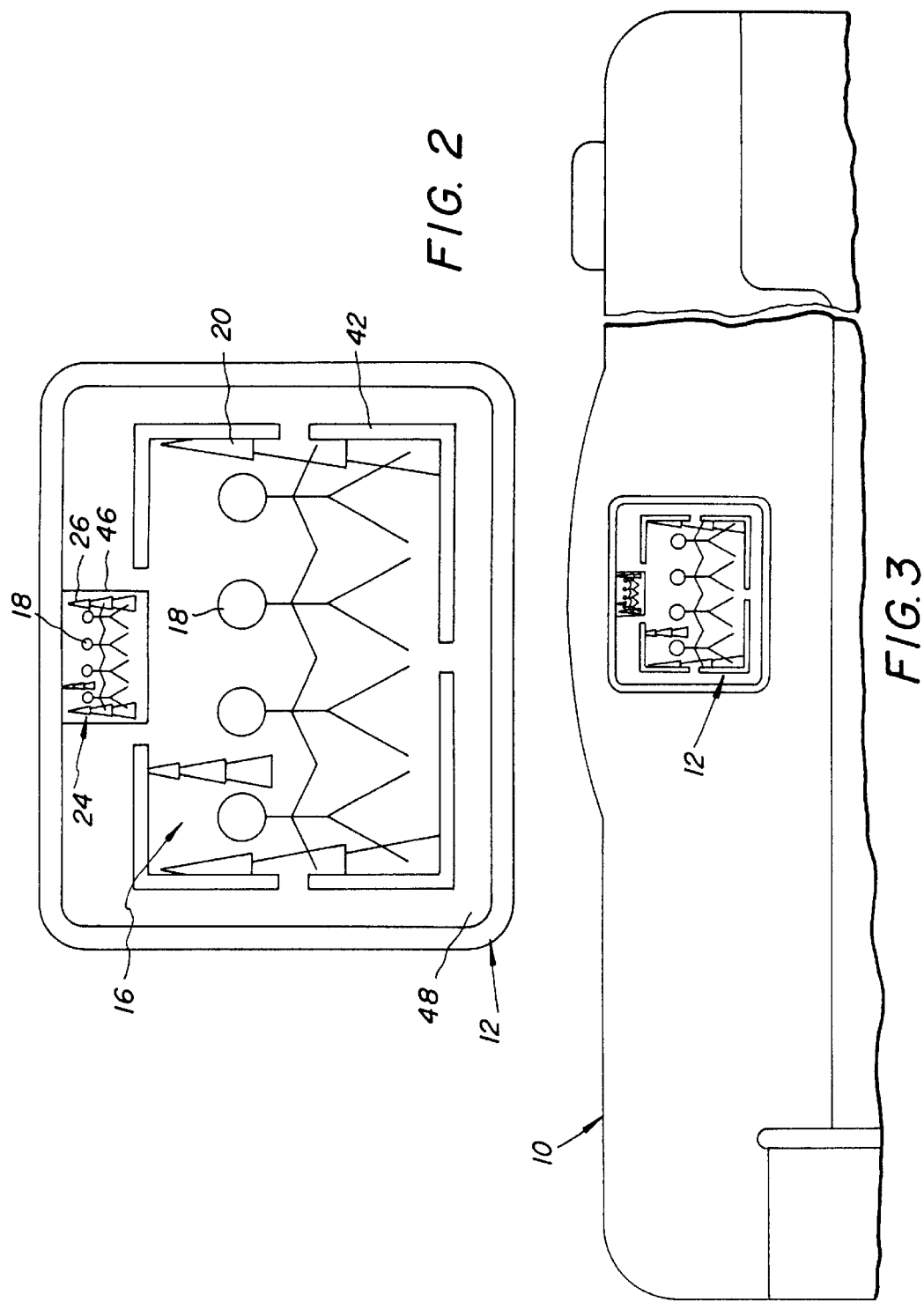
FIG. 2 is an elevation view of dual images of a subject, including greater and lesser background areas of the subject, that can be simultaneously viewed when looking through a rear finder lens of the dual image viewfinder.
FIG. 3 is a rear elevation view of a camera including the dual image viewfinder.

FIG. 3 shows a point-and-shoot camera 10 including a dual image viewfinder 12. The dual image viewfinder 12 is one that is commonly referred to as a "bright-line" viewfinder.

Figure 1:
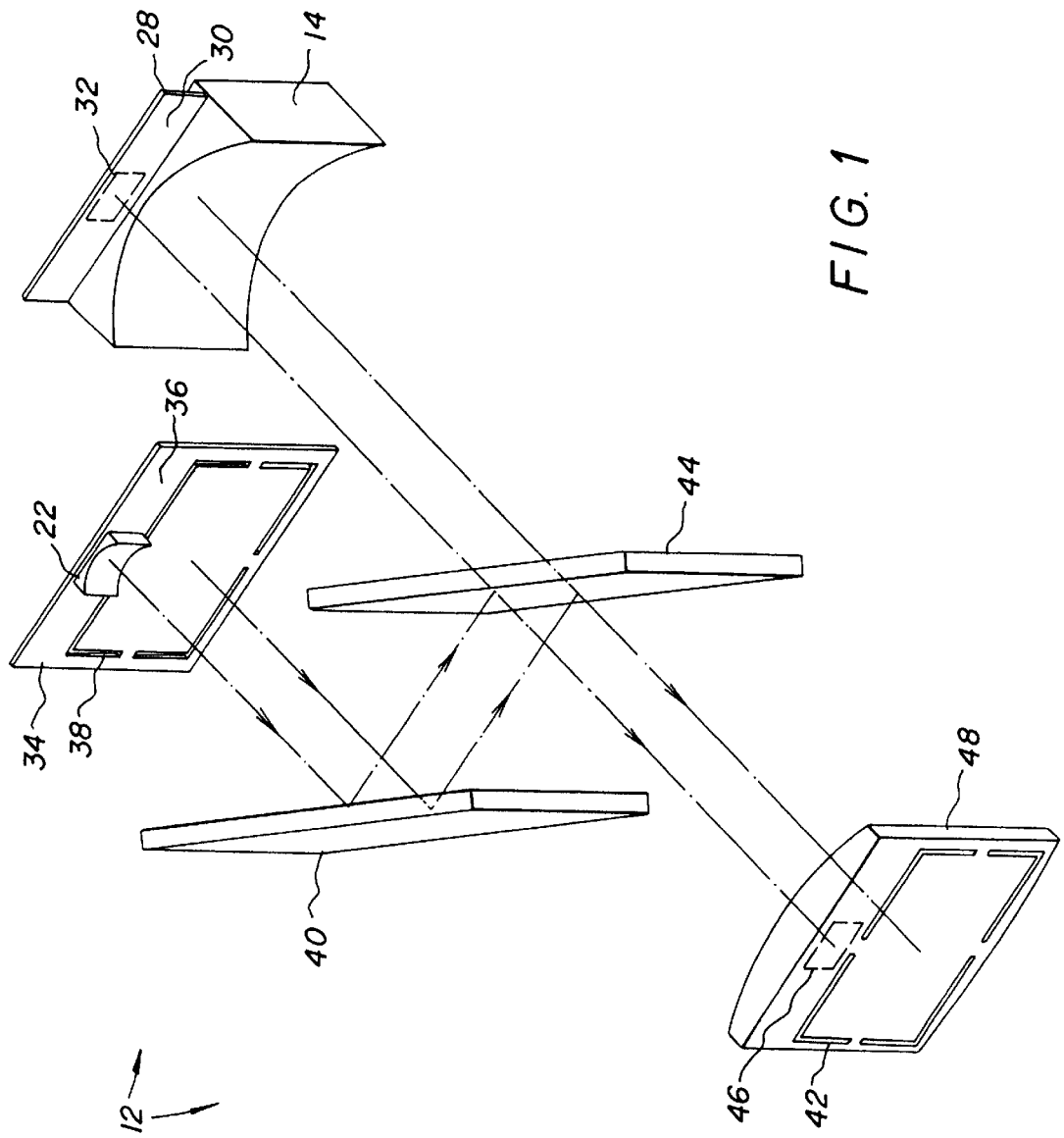
FIG. 1 is a perspective view of a dual image viewfinder according to a preferred embodiment of the invention.

As shown in FIGS. 1 and 2, the dual image viewfinder 12 has a first front finder (objective) lens 14 for forming a first image 16 of a subject 18, e.g. a row of people, including a background area 20 of the subject, e.g. several trees. The first finder lens 14 preferably is a rectangular negative lens. A second front finder (objective) lens 22 is provided for forming a second image 24 of the subject 18 including a background area 26 of the subject, e.g. the trees. The first and second finder lenses 14 and 22 have different aspect ratios in order to effect lesser and greater fields of view. Consequently, the background area 26 in the second image 24 covers more area than (is greater than) the background area 20 in the first image 16. This is shown in FIG. 2. The second finder lens 22, like the first finder lens 14, preferably is a rectangular negative lens. Also, the second finder lens 22 is substantially smaller than the first finder lens 14. Thus, the second image 24 is substantially smaller than the first image 16.

A front rectangular window 28 is connected to the first finder lens 14 and is covered with a diffusing (light-scattering) screen 30. See FIG. 1. A first bright-line rectangular frame 32 is cut into an opaque masking plate (not shown) behind the diffusing screen 30. A front rectangular window 34 is connected to the second finder lens 22 and is covered with a diffusing (light-scattering) screen 36 except at the second finder lens. A second bright-line rectangular frame 38 is cut into an opaque masking plate (not shown) behind the diffusing screen 36 so that light can pass through the bright-line frame. The first and second bright-line frames 32 and 38 have different aspect ratios that correspond to (match) the aspect ratios of the respective lenses 14 and 22. Also, the second bright-line frame 38 is substantially larger than the first bright-line frame 32.

A total reflection mirror 40 is optically aligned at a 45° angle with the second front finder lens 22 and the second bright-line frame 38 for reflecting the image 24 of the subject 18 including the background area 26 of the subject formed by the second finder lens and for reflecting an image 42 of the second bright-line frame. See FIGS. 1 and 2. A partial reflection mirror or beam splitter 44 is optically aligned parallel with the total refection mirror 40 for reflecting the images 24 and 42 of the subject 18 and the second bright-line frame 38 reflected by the total reflection mirror and is optically aligned at a 45° angle with the first front finder lens 14 without obstructing the image 16 of the subject 18 including the background area 20 of the subject formed by the first finder lens and without obstructing an image 46 of the first bright-line frame 32.

A rear finder lens 48 is optically aligned with the partial reflection mirror 42, the first front finder lens 14 and the first bright-line frame 32. This permits one to view, when looking through the rear finder lens 44, the partial reflection mirror 42 and the front finder lens 14, the (reflected) image 42 of the second bright-line frame 38 superimposed on the (virtual) image 16 of the subject 18, including the background area 20 of the subject, formed by the first finder lens and for viewing the (virtual) image 46 of the first bright-line frame 32 superimposed on the (reflected) image 24 of the subject, including the background area 26 of the subject, formed by the second finder lens 22. See FIGS. 1 and 2.

Viewing Method

A method of viewing dual images of the subject 18 in the viewfinder 12, comprises the steps:

forming the first image 16 of the subject 18 including the background area 20 of the subject;

forming the second image 24 of the subject 18 including the background area 26 of the subject that is greater than the background area 20 of the subject included in the first image 16; and permitting simultaneous viewing of the first and second images 16 and 24 of the subject 18 including the greater and lesser background areas 26 and 20 of the subject.

Also, there is optionally included the steps:

superimposing the image 46 of the first frame 32 on the second image 24 of the subject 18;

superimposing the image 26 of the second frame 38 on the first image 16 of the subject 18, whereby, the image 26 of the second frame 38 superimposed on the image 16 of the subject 18 and the image 46 of the first frame 32 superimposed on the image 24 of the subject can be simultaneously viewed.

The invention has been described in detail with particular reference to certain preferred embodiments thereof, but it will be understood that variations and modifications can be effected within the spirit and scope of the invention.

PARTS LIST 10. camera
12. dual image viewfinder
14. first front finder lens
16. virtual image of subject including lesser background area
18. subject
20. lesser background area
22. second front finder lens
24. reflected image of subject including greater background area
26. greater background area
28. front window
30. diffusing screen
32. first bright-line frame
34. front window
36. diffusing screen
38. second bright-line frame
40. total reflection mirror
42. reflected image of second bright-line frame
44. partial reflection mirror
46. virtual image of first bright-line frame
48. rear finder lens

What is claimed is:

1. A dual image viewfinder comprising:
   a first front finder lens for forming an image of a subject;
   a second front finder lens for forming an image of the subject;
   a mirror arranged with respect to said second front finder lens for reflecting the image formed by said second finder lens; and
   a rear finder lens arranged with respect to said front finder lens for viewing the image of the subject formed by said first finder lens and arranged with respect to said mirror for viewing the image of the subject formed by said second finder lens and reflected by said mirror, whereby dual images of the subject can be simultaneously viewed when looking through said rear finder lens.

2. A dual image viewfinder comprising:
   a first front finder lens for forming an image of a subject;
   a second front finder lens for forming an image of the subject;
   a total reflection mirror optically aligned with said second front finder lens for reflecting the image of the subject formed by said second finder lens;
   a partial reflection mirror optically aligned with said total refection mirror for reflecting the image of the subject reflected by said total reflection mirror and optically aligned with said first front finder lens without obstructing the image of the subject formed by said first finder lens; and
   a rear finder lens optically aligned with said partial reflection mirror for viewing the image of the subject reflected by said partial reflection mirror and for viewing the image of the subject formed by said first finder lens, whereby dual images of the subject can be simultaneously viewed when looking through said rear finder lens.

3. A dual image viewfinder as recited in claim 2, wherein respective images of frames are superimposed on the images of the subject viewed when looking through said rear finder lens.

4. A dual image viewfinder as recited in claim 2, wherein said second finder lens is substantially smaller than said first finder lens for forming an image of the subject that is substantially smaller than the image of the subject formed by said first finder lens.

5. A dual image viewfinder as recited in claim 2, wherein said second finder lens has a field of view that is greater than a field of view of said first finder lens so that that when looking through said rear finder lens the image of the subject reflected by said partial reflection mirror includes a background area that is greater than a background area included in the image of the subject formed by said first finder lens.

6. A dual image viewfinder comprising:
   a first front finder lens for forming an image of a subject including a background area of the subject;
   a second front finder lens for forming an image of the subject including a background area of the subject that is greater than the background area of the subject included in the image of the subject formed by said first front finder lens; and
   a rear finder lens for simultaneously viewing the images of the subject formed by said first and second finder lenses, whereby dual images of the subject including greater and lesser background areas of the subject can be simultaneously viewed when looking through said rear finder lens.

7. A dual image viewfinder as recited in claim 6, wherein said first and second finder lenses have different aspect ratios to effect lesser and greater fields of view.

8. A dual image viewfinder as recited in claim 7, wherein respective images of frames having aspect ratios corresponding to the aspect ratios of said first and second finder lenses are superimposed on the images of the subject viewed when looking through said rear finder lens.

9. A dual image viewfinder as recited in claim 6, wherein said first and second finder lenses are larger and smaller rectangular negative lenses.

10. A dual image viewfinder as recited in claim 6, wherein a front window having a first bright-line frame is connected to said first finder lens and a front window having a second bright-line frame is connected to said second finder lens for superimposing respective images of said first and second brightline frames on the images of the subject when looking through said rear finder lens.

11. A dual image viewfinder as recited in claim 6, wherein said first and second finder lenses have different aspect ratios to effect lesser and greater fields of view of the respective lenses, and first and second bright-line frames have aspect ratios corresponding to the aspect ratios of said first and second finder lenses for superimposing respective images of said first and second bright-line frames on the images of the subject when looking through said rear finder lens.

12. A dual image viewfinder comprising:

first means for forming an image of a subject including a background area of the subject;

second means for forming an image of the subject including a background area of the subject that is greater than the background area of the subject included in the image of the subject formed by said first front finder lens, and means for permitting simultaneous viewing of the images of the subject formed by said first and second means, whereby dual images of the subject including greater and lesser background areas of the subject can be simultaneously viewed.

13. A dual image viewfinder comprising:

means for superimposing a reflected image of a first frame on a virtual image of a subject;

means for superimposing a virtual image of a second frame on a reflected image of the subject; and means for simultaneously viewing the reflected image of said first frame superimposed on the virtual image of the subject and the virtual image of said second frame superimposed on the reflected image of the subject.

14. A dual image viewfinder as recited in claim 13 wherein the reflected image of said first frame and the virtual image of the subject have a similar aspect ratio, and the virtual image of said second frame and the reflected image of the subject have a similar aspect ratio that is different than the aspect ratio of the reflected image of said first frame and the virtual image of the subject.

15. A dual image viewfinder as recited in claim 14 wherein the reflected image of said first frame and the virtual image of the subject are larger than the virtual image of said second frame and the reflected image of the subject.

16. A method of viewing dual images of a subject in a viewfinder, comprising:

forming a first image of a subject including a background area of the subject;

forming a second image of the subject including a background area of the subject that is greater than the background area of the subject included in the first image of the subject; and permitting simultaneous viewing of the first and second images of the subject including greater and lesser background areas of the subject.

17. A method of viewing dual images of a subject in a viewfinder, comprising:

superimposing a virtual image of a first frame on a reflected image of the subject;

superimposing a reflected image of a second frame on a virtual image of a subject; and permitting simultaneously viewing of the reflected image of the second frame superimposed on the virtual image of the subject and the virtual image of the first frame superimposed on the reflected image of the subject.

* * * * *